US009684960B2

(12) United States Patent
Buzaglo et al.

(10) Patent No.: US 9,684,960 B2
(45) Date of Patent: Jun. 20, 2017

(54) AUTOMATED HISTOLOGICAL DIAGNOSIS OF BACTERIAL INFECTION USING IMAGE ANALYSIS

(71) Applicant: PANGEA DIAGNOSTICS LTD., Haifa (IL)

(72) Inventors: Isaac Daniel Buzaglo, Haifa (IL); Amir Aharon Handzel, Waltham, MA (US)

(73) Assignee: Pangea Diagnostics Limited, Haifa (IL)

( * ) Notice: Subject to any disclaimer, the term of this patent is extended or adjusted under 35 U.S.C. 154(b) by 0 days.

(21) Appl. No.: 14/604,848

(22) Filed: Jan. 26, 2015

(65) Prior Publication Data
US 2015/0213599 A1    Jul. 30, 2015

Related U.S. Application Data

(60) Provisional application No. 61/931,572, filed on Jan. 25, 2014.

(51) Int. Cl.
| | |
|---|---|
| *G06K 9/00* | (2006.01) |
| *G06T 7/00* | (2017.01) |
| *G06K 9/52* | (2006.01) |
| *G06F 17/30* | (2006.01) |
| *G06K 9/62* | (2006.01) |
| *G06K 9/46* | (2006.01) |

(52) U.S. Cl.
CPC ........ *G06T 7/0012* (2013.01); *G06F 17/3028* (2013.01); *G06K 9/4628* (2013.01); *G06K 9/52* (2013.01); *G06K 9/627* (2013.01); *G06T 2207/10056* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS 6,640,130 B1 * 10/2003 Freeman .............. A61B 5/0059
382/128
2007/0269086 A1    11/2007 Kerwin et al.
(Continued)

FOREIGN PATENT DOCUMENTS

| WO | WO 2010/003044 | 1/2010 |
|---|---|---|
| WO | WO 2013/052824 | 4/2013 |
| WO | WO 2013/083815 | 6/2013 |

OTHER PUBLICATIONS

International Appl. PCT/US15/12809, Search Report dated Apr. 14, 2015.

*Primary Examiner* — Shefali Goradia
(74) *Attorney, Agent, or Firm* — Pearl Cohen Zedek Latzer Baratz LLP (57) ABSTRACT

The invention relates to an automated decision support system, method, and apparatus for analysis and detection of bacteria in histological sections from tissue biopsies in general, and more specifically, of *Helicobacter pylori* (HP) in histological sections from gastric biopsies. The method includes image acquisition apparatus, data processing and support system conclusions, methods of transferring and storing the slide data, and pathologist diagnosis by reviewing and approving the images classified as containing bacteria, and more specifically HP findings.

20 Claims, 6 Drawing Sheets

(56) References Cited

U.S. PATENT DOCUMENTS

2009/0318815 A1* 12/2009 Barnes ................ A61B 5/0062
                                                           600/473
2012/0020542 A1   1/2012 Tafas et al.
2013/0089248 A1*  4/2013 Remiszewski ..... G06K 9/00127
                                                           382/128

* cited by examiner

AUTOMATED HISTOLOGICAL DIAGNOSIS OF BACTERIAL INFECTION USING IMAGE ANALYSIS

CROSS REFERENCE TO RELATED APPLICATIONS

This application claims the benefit of U.S. Provisional Application No. 61/931,572, filed on Jan. 25, 2014 and entitled AUTOMATED HISTOLOGICAL DIAGNOSIS OF BACTERIAL INFECTION USING IMAGE ANALYSIS, which is incorporated in its entirety herein by reference.

BACKGROUND OF THE INVENTION

Field of the Invention

The invention relates generally to the field of image processing, and more particularly relates to automated optical inspection, template matching segmentation, classification, features extraction, pattern recognition techniques and machine learning of digitized microscope slides.

The invention relates also to histology analyses, and in particular, to decision support systems for diagnostic use by pathology professionals for the determination of the presence of bacteria in tissue biopsies, in general, and presence of *Helicobacter pylori* ("HP") in histological specimens of the stomach, in particular.

Description of the Related Art

Histology is a branch of science which studies the microscopic structures of organic tissues. Histological analysis is performed by examining a thin slice of a microscopically sectioned tissue biopsy under a microscope, in order to determine the possible presence of cells of a certain cellular type, or to recognize a variety of microbial components or to recognize architectural structures of the tissue. For example, a histological analysis may be performed on a tissue sample slide to detect the presence of HP in a tissue biopsy.

HP is one of the most common bacterial pathogens; it infects the gastric mucosa in humans and it is estimated that by adulthood over half the world population is infected. This bacterium is Gram negative, spiral-shaped, and motile by polar flagella.

A certain proportion of the infected population will develop acute gastritis or gastric or duodenal ulcers. Some persons may develop gastric cancers. Because of strong association between gastric cancer and HP infection this bacterium is classified as a bacterial carcinogen.

Gastric biopsies are often extracted during endoscopic examination to rule out HP infection by histologic evaluation. Histology is considered to be the reference ("gold standard") in the direct diagnosis of HP gastritis. Before observation, slices are subjected to staining in order to obtain the prepared pieces to be inspected and enhance contrast. An experienced pathologist is needed to inspect the histological slice in order to determine the possible presence of HP. This procedure is exhausting and prone to a high false negative rate due to the tedium and fatigue suffered by the pathologist.

Some attempts in the field of automated image segmentation and classification of histological specimens have been made, based on morphometric and color features, but have encountered difficulties due to the unique characteristics of histology imaging and the complex structures associated with cells and tissue architecture.

Identification of components in an image requires applying segmentation techniques for classification. The slide specimen includes many complex arrangements and architectures, including overlapping tissue components, cell boundaries and nuclei corrupted by noise which is not present in a blood sample for example. Some structures, such as cells, may appear connected, blurred or occluded by other tissue elements in the image. Furthermore, the cell architecture and bacteria may be presented in various 3D orientations due to the method of slicing that exacerbate the challenge of image analysis. Those complexities have made histological slides difficult to extract cell regions and bacteria by traditional image segmentation approaches. When attempting to segment and recognize bacteria in tissue all the above challenges exist and are made significantly more complicated because of the small size of bacteria in histological images both in absolute measure and by their much smaller size relative to the surrounding tissue features. Identification of the boundaries of a bacterium is especially difficult on such background.

The concept of a "neural network," per se, is known in the art, disclosed for example in U.S. Pat. Nos. 5,287,272; 6,327,377; and 8,655,035 which are incorporated herein by reference in their entirety for their teaching of image analysis techniques known in the art. However, a convolutional neural network ("CNN") or similar machine learning algorithm has not previously been applied to the identification of one or more bacteria in a histological specimen, mainly because the small size of bacteria coupled with the background "noise" in the image impedes automated identification. Teaching a machine to identify HP in tissue through an iterative process of machine learning represents a novel contribution to the state of the art.

SUMMARY OF THE INVENTION

The present invention relates to a method, a system and an apparatus for automated diagnosis and decision support of histology slides through automated detection of bacteria in general, and more specifically of HP.

Thus, in one aspect, the invention is a method for automated analysis and diagnosis of the presence of a bacterium in a histological specimen, comprising: providing a specimen-stained slide; obtaining a color scanned image of the slide with a color digital camera (such as a charge-coupled device ("CCD") or complementary metal-oxide semiconductor ("CMOS") digital camera); associating identification data with the slide (which may be done using manual data entry, a barcode reader or optical character recognition, for example); transforming the color scanned image into a single band image; searching parts of the single band image that match a pattern identified by gray level values, wherein parts matching the pattern are candidate object components; classifying the candidate object components with a subsequent additional machine language classifier (preferably a CNN classifier); creating from the CNN classifier an automatic decision support diagnosis report of the presence or absence of the bacterium in the specimen; and storing images with associated metadata and the decision support diagnosis report in a computer readable medium.

In embodiments, the method includes receiving diagnosis information (for example from a pathologist making a determination based on the support diagnosis report) and including the diagnosis information in the CNN classifier (or other machine language classifier) going forward.

In other embodiments the method omits the steps of pattern identification and relies completely on a CNN that has been trained using a database of images to produce an automatic support diagnosis report. The CNN, having previously been trained with a database of images, has acquired the ability to recognize and report with some precision the presence of bacteria in the tissue image. The necessary information is implicitly stored in its large set of internal parameters whose values have been gradually adjusted during the presentation of the images in the database using an appropriate training algorithm.

In another aspect, the invention is a system for automated analysis and diagnosis of the presence of a bacterium in a histological specimen, comprising: a specimen-stained slide; an automated microscope for enlarging the images of the slide; a color digital video camera (CCD or CMOS for example) for creating a digital image from the slide; a mechanical stage control for automatically scanning the specimen; a slide feeder; one or more computer(s) running an image processing classifier for analyzing the digital image and providing a support diagnosis report of the presence or absence of the bacterium in the specimen. The system further comprises an external database for images and report storage. The one or more computer(s) run an image processing classifier adapted to search parts of a single band image obtained from the digital image that match a pattern of a bacterium identified by gray level values, wherein parts matching the pattern are identified as candidate object components. The computer(s) are adapted to run an additional CNN classifier to classify the candidate object components to obtain an automatic decision support diagnosis report of the presence or absence of the bacterium in the specimen, which is then stored in the external database.

A microscope is provided for enlarging the images of the gastric, intestinal or other tissue, such as a commercially available automated histology microscope with a color CCD or CMOS digital video camera, having a manually or automatically controlled stage for scanning a slide. Optionally, external illumination system(s) provide visible light illumination. The microscope is further provided with a mechanical stage having the ability to be controlled externally by a computer for automatic scanning of a slide using an automated slide feeder. In embodiments, the CCD or CMOS digital video camera is adapted to obtain 3D images of a histological specimen slide for analysis. An example of a 3D imaging method comprises optical sectioning of the tissue slide, using emitted in-focus and out-of-focus light, to create multiple layers of 2D images.

The invention includes an initial module comprising template matching methods. This initial classifier identifies objects in images that have image characteristics of bacteria, in particular of HP. The output of this module is a set of candidates of such image objects. A candidate object component is a part of an image, which may be as small as a pixel, which is considered more likely to be within HP. These are fed to a subsequent classifier that further processes the candidates by algorithms of pattern recognition, such as machine learning and CNN, and confirms or rejects their identity as the target object. The information about confirmation or rejection by each pathologist may then be communicated back to a central processor. The data thus obtained may be evaluated and maintained on a central server(s) such that the data can be reintroduced into the CNN. This feedback information is accumulated from multiple, possibly independent users of the system who are located in diverse and distant locations. It is used to further calibrate and fine-tune the CNN for improved performance.

Another objective of the present invention is to provide a system to enable the storage of large quantity of data and images that are accumulated. It is proposed that the system can include local storage or network storage linked in a network structure.

It is proposed that the images and the data will be accessible by a computer via a communication network. Specifically, the system provides an editable summary screen or screens showing relevant images from the automatic diagnosis containing bacteria, or specifically HP findings; in this application, the pathologist will diagnose the slide based on the automated support system.

These and other objects, advantages and features of the present invention will become evident to those of ordinary skill in the art after having read the following detailed description of the preferred embodiment. However, it will be appreciated that this is but one example of the application of the principles of the invention which are intended for application for classification of many other bacteria on histological slides.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
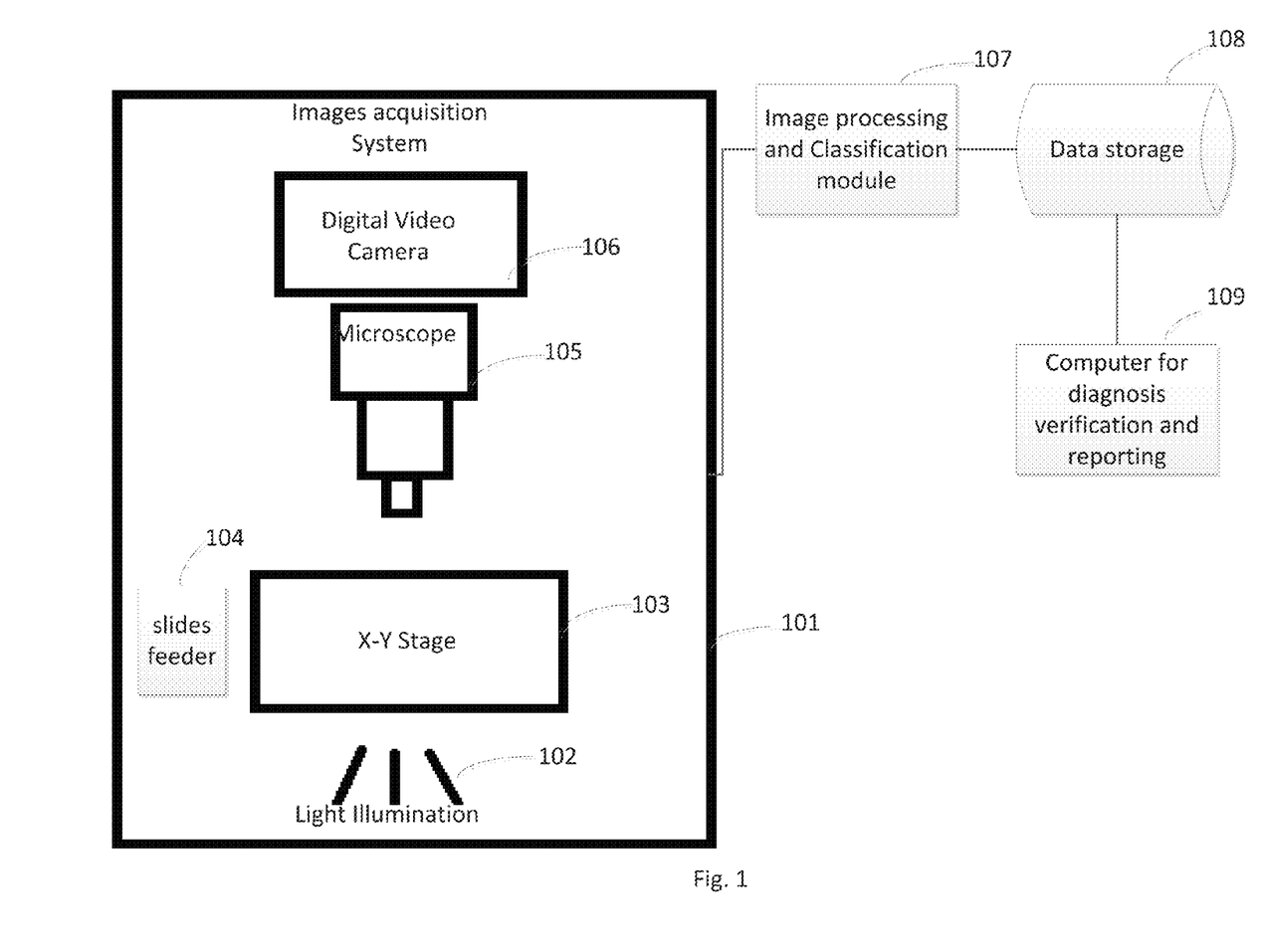
FIG. 1 shows a schematic representation of an alternate embodiment of an automated screening apparatus and system in accordance with the methods of the invention.

FIG. 1 illustrates a schematic representation of an automated screening apparatus and system according to an embodiment of the invention. Image acquisition system 101 includes visible light illumination 102, X-Y automated stage 103 equipped with a motor controller for stage movement, slide feeder 104, microscope 105, and a color RGB CCD or CMOS camera 106 to acquire digital images. The images obtained from image acquisition system 101 are transferred to image processing module 107 for automated classification decision. Slide data is sent to the data storage module 108 in the local or network computers, waiting for the pathologist 109 to upload suspected images with HP for diagnosis review.

Figure 2:
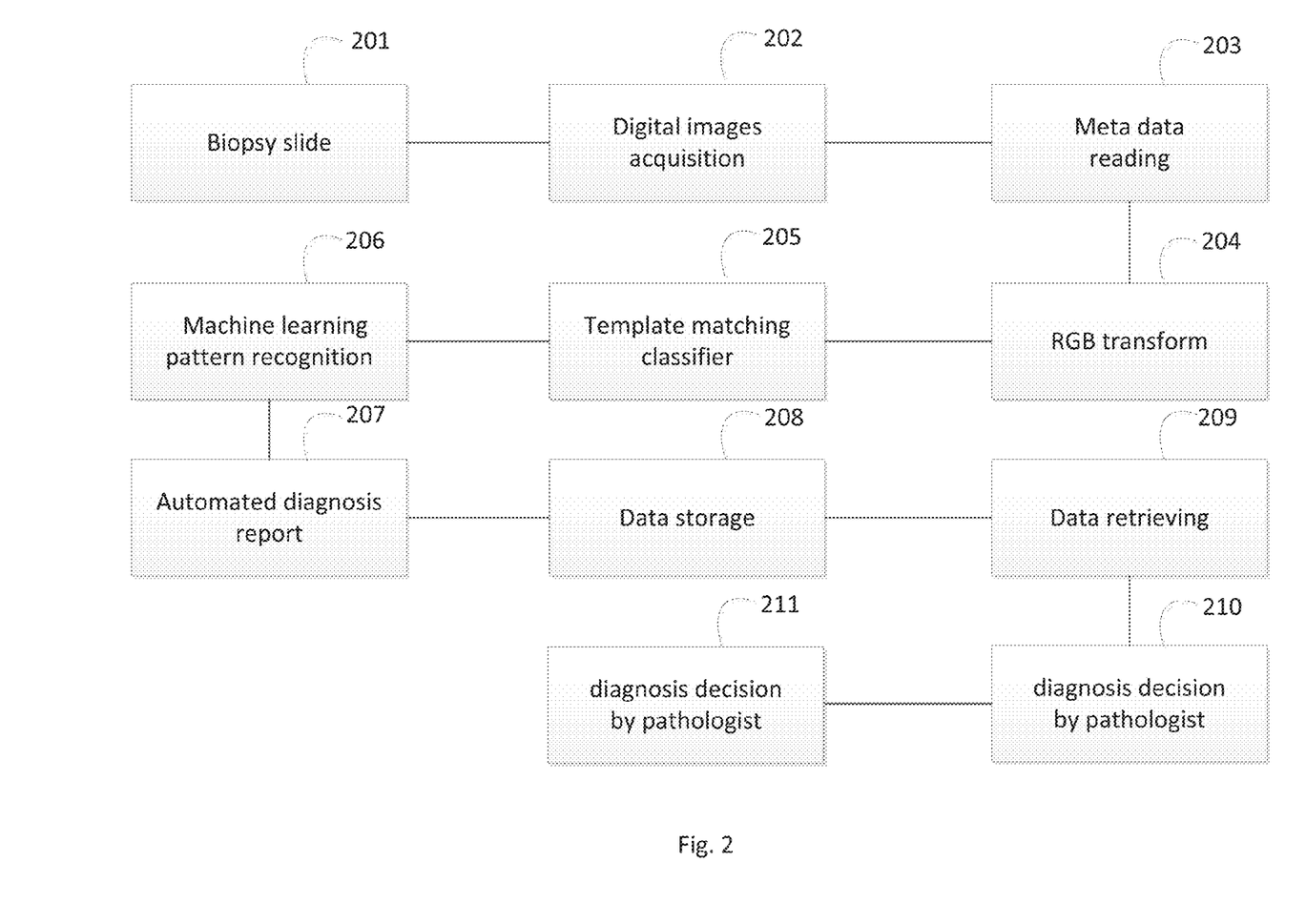
FIG. 2 shows a flow chart summarizing the method of one embodiment of the invention, illustrating the steps from the biopsy procedure to the final diagnosis by a pathologist.

FIG. 2 illustrates a schematic representation of an embodiment of a method of the invention. In which an endoscopic examination is performed to select microscopic biopsies from the stomach 201. These tissue biopsies are sectioned, mounted on a glass slide and stained to enhance contrast in the microscopic image. For example, in some embodiments of the invention, the histological specimen slices may be stained, by H&E or Giemsa staining to enhance certain features in the image. The slide is then loaded on an automated screening device 202 for the acquisition of color image or images of the histology slide specimen. Metadata 203 are collected by a barcode reader or an OCR reader, or entered manually. Metadata includes information relevant to the specimen, such as, without limitation, indexing information, source identification of the specimen, how the image was obtained, and the like. Thus, a slide may be looked up in the system by specifying unique slide identification metadata, and data associated with the specimen may be associated with the identification data.

The color RGB image or images 204 are transformed into a single band image (gray level) which is then normalized (for example by a weighted normalized superposition of the three bands, or by applying Mahalanobis color segmentation). The resultant gray scale image is used for the template matching algorithm 205. Template matching techniques are used to search small parts of the image that match the HP template pattern (or "mask"). Two specific template matching methods are described here.

According to the first template matching method, initial edge detection and completion are performed resulting in the segmentation of the image and identification of areas of closed objects in the image. Spatial two dimensional second moments are calculated for each closed object. The eigenvectors and eigenvalues of the image covariance matrix are calculated. For each closed object, conditions are tested for the total area and for the covariance eigenvalues; if these parameters correspond to those of images of HP then the closed object is declared a candidate HP.

According to the second template matching method, the image is scanned pixel by pixel, and each pixel is tested for being in the interior and near the central area of a bacterium in the image. This analysis uses a sub-image "moving window" centered at each pixel as it is being analyzed. Once the analysis of a pixel is completed the sub-image window moves to the next pixel; the procedure continues until the image is fully scanned. A detailed description of the analysis procedure for each pixel is given below in connection with FIG. 3. The above template matching process feeds the subsequent machine learning module with a reduced set of HP template candidates.

Pattern recognition module 206 uses supervised machine learning to provide definitive identification of bacteria candidates in the tissue. In preferred embodiments, the machine learning architecture is a CNN. The CNN performs feature extraction and classification within the same architecture, preserving the two-dimensional spatial structure of the input image. In embodiments, the input layer of the supervised machine learning is a 36×36 sub-image centered at each of the centroids previously found by the template matching algorithm. It will be appreciated by the person of ordinary skill in the art that the CNN may be implemented with a variety of equivalent structures.

The output layer generated by the supervised CNN network has two classification labels: positive or negative HP found in the sub-image.

At the end of this step, an automated diagnosis output report 207 is produced and appended to the metadata of the slide. The report summarizes the findings of HP, by mapping the positions of the HP found into an additional file for each relevant image or for all the images of the slide. The slide images, the metadata and the automated diagnosis report are transferred to a local storage or network storage 208 for storing and retrieving. In another computer 209 a pathologist loads the slide images and diagnosis for validation. The software provides image annotation by displaying and highlighting or marking on the screen small regions with HP findings, to be validated by the pathologist. Those small regions can be expanded, moved to any location within the image or zoomed in or out. The pathologist can add or remove image annotation and findings. At the end of the reviewing the pathologist closes the files related to the examined slide with the confirmed findings and the diagnosis 210. The pathologist's diagnosis is stored with the slide data, and possibly printed 211 for delivering a report. It can also be linked to other forms of reporting, such as Electronic Medical Records, in the healthcare center or system, thus providing an end-to-end system. Information related to the pathologist's diagnosis and subsequent processing, is collectively referred to herein as "diagnosis information."

A specific embodiment of a method of the invention is to perform 206, the CNN, without 205, the Template Matching classifier. In this case, for every single pixel of the inspected image, a surrounding rectangle of 36×36 pixels is fed as input to the machine learning engine in order to classify it as positive or negative HP finding.

Figure 3:
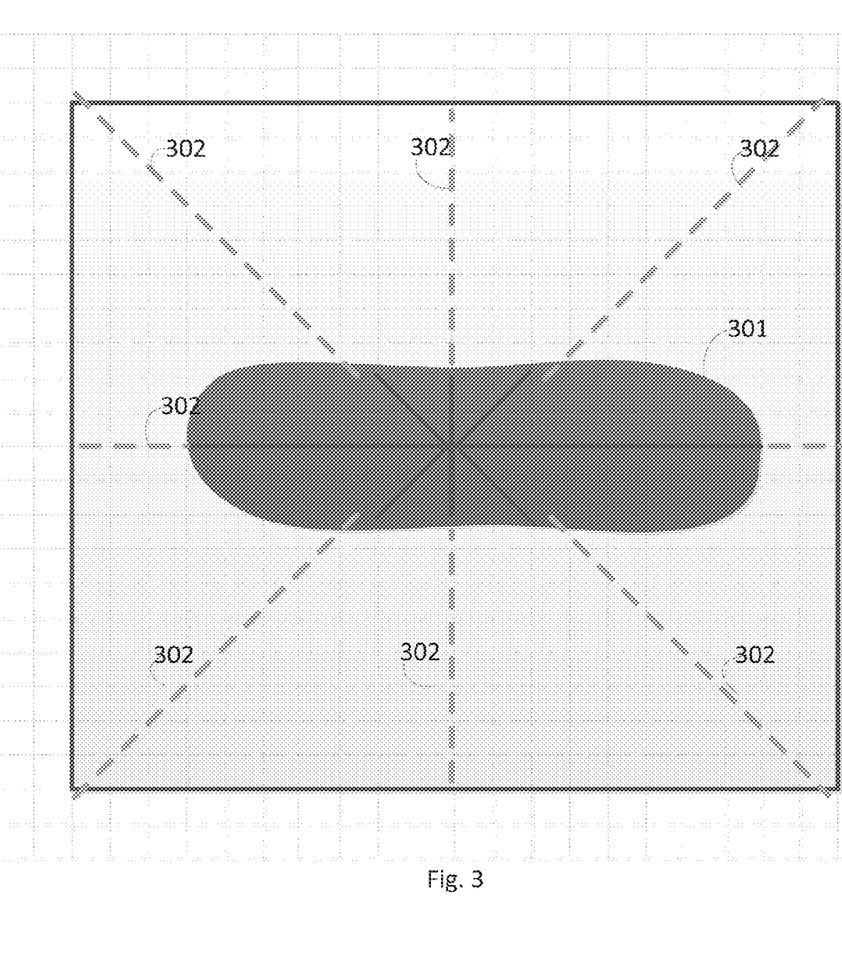
FIG. 3 shows a schematic illustration of a characteristic HP pattern, matching the mask template of multiple angular lines for the detection of the principal edges of the object.

Several methods of pattern matching, prior to classification by a machine language classifier may be used. In embodiments, a template mask is used. In this context, a "mask" may have fixed pattern elements as well as additional dynamic constructive elements, analogous to finite impulse filters in classic one-dimensional classical signal processing. The example of FIG. 3 depicts a template mask construction for a characteristic HP bacterium pattern 301. The reference template mask is composed of 8 rays of length MaxLineLength 302, all emanating from the tested pixel and situated at 45 degrees angle between adjacent ones. For images optically magnified by 60× MaxLineLength equals 10 pixels. The following conditions are then computed and tested; all need to be satisfied for the pixel to be declared a candidate for presence of HP:

1) The possible existence of boundaries of an image object are sought by reading the gray level values of the image pixels along each of the rays are read starting from the currently tested pixel (the central pixel). A jump or gap in the light intensity is sought along each ray, whether it is upward or downward; if detected, the location of the jump is stored for subsequent analysis and is interpreted as the intersection of the ray with a possible border of an image object. In order for the pixel to be considered a candidate HP, a jump in intensity must be detected along all the eight rays.

Next, for every reference template ray, the distance between the pixel of intensity jump and the tested pixel in the image is calculated and denoted "LineLength".

2) The smallest LineLength of the eight values is checked for being smaller than a "MaxShortAxis" value.

3) The difference between the largest LineLength of the eight values and the smallest LineLength is tested for being larger than a "Delta" value.

4) The two largest LineLength values are checked for being of rays at a relative angle (without orientation) of greater than 90 degrees.

If all the above conditions are satisfied then the tested pixel is added to the list of HP candidate pixels.

All the pixels of the entire image are examined and tested with the above described procedure.

Next, groups of pixels are associated with each other as belonging to the same object using morphological image processing operators. For each group of associated pixels the centroid is calculated; each centroid then represents a candidate HP bacterium image object.

The above example refers to HP bacteria which have spiral shape. Other bacteria of different shape families are detected by the same template matching model but with different values for MaxLineLength of the 8 rays, and different relations among the resulting LineLength values of the rays in the specified conditions. In the Bacilli family of bacteria, for example, the template matching conditions for the detection of the *Shigella dysenteriae* bacteria is the same as shown in FIG. 3 example, except for condition number four: The two largest LineLength values are checked for being of rays at a relative angle (without orientation) of 180 degrees. For the Coccus shape family, for example, the template matching conditions to detect the Coccidioides immitis bacteria are different except for the condition 1 (which is the same), as follows:

2. The smallest LineLength of the eight values is checked for being between "MaxShortAxis" and "MinShortAxis" values.

3. The difference between the largest LineLength of the eight values and the smallest LineLength is tested for being smaller than a "Delta" value.

The fourth condition is omitted.

Figure 4:
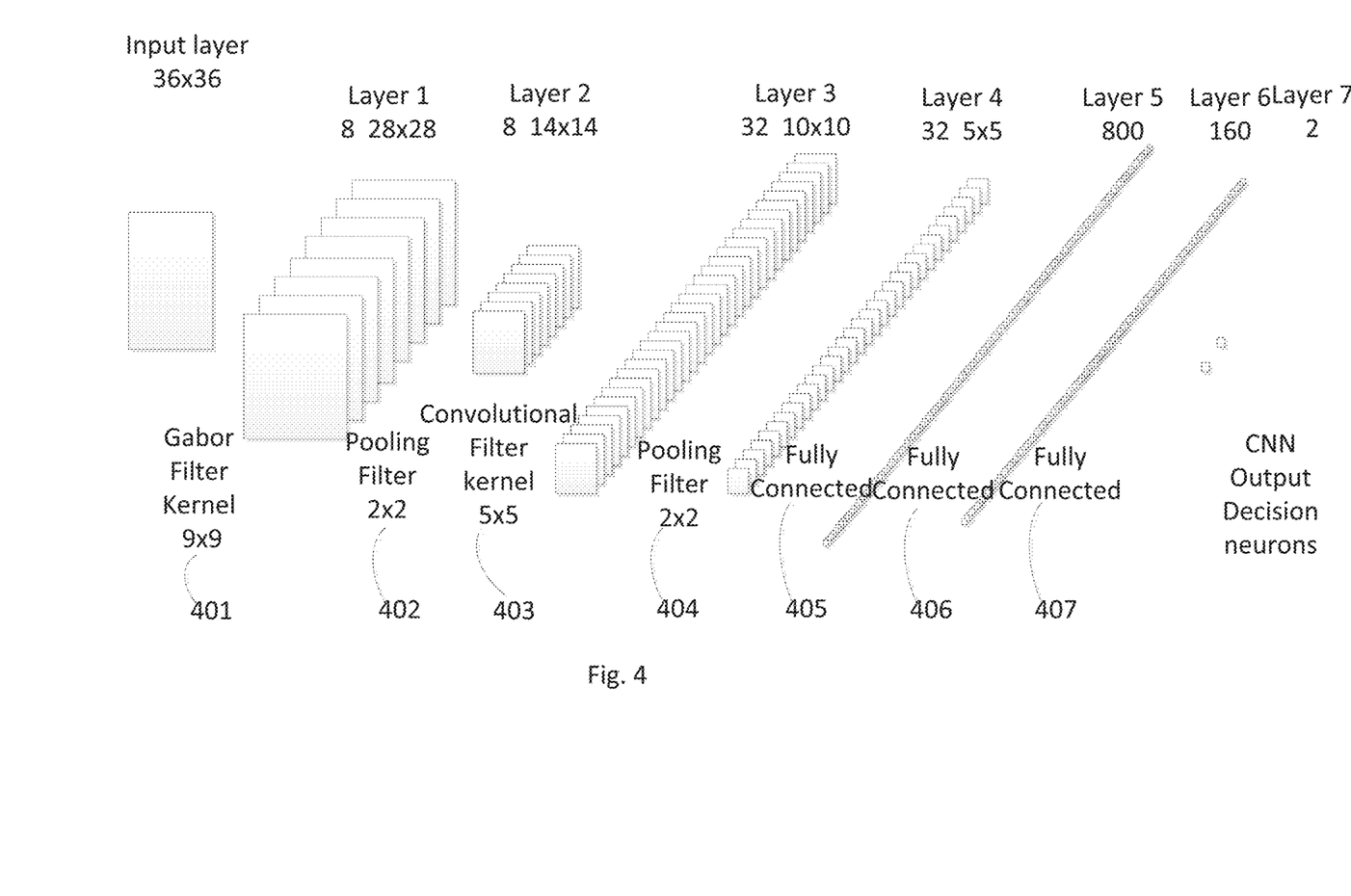
FIG. 4 shows a block diagram of an embodiment of a CNN according to the present invention.

The CNN architecture of the network FIG. 4. detects the HP bacteria in tissue, but can also be used to detect other bacteria in tissue. In the example shown, the CNN contains two convolutional layers (401, 403), two pooling layers (402, 404), and three fully-connected layers (405, 406, 407), but any other CNN of appropriate architecture could work. The input layer is a 36×36 single band sub-image of the HP candidate. Prior to the first layer, 8 first order Gabor filters of size 9*9 are convolved separately with the input data resulting in 8 28×28 sub-images. The second layer performs 2×2 pooling of the data of the first layer resulting in 8 14*14 sub-images. The third layer is a Convolutional layer convolving 4 kernels of size 5×5 with the second layer resulting in 32 10×10 sub-images. The Fourth layer, performs 2×2 pooling of the data resulting in 32 5×5 sub-images. The next three layers are fully connected. The first of these is composed of 32*5*5=800 neurons which were constructed in the preceding (i.e. fourth) layer; the second of the three layers is composed of 160 neurons; and the output layer is composed of 2 neurons.

In order for the CNN to perform the classification task, first it has to be trained, i.e. its internal parameters have to be adjusted based on real data of images. To train the network, a set of images is shown to the CNN whose weights and biases are calibrated by using gradient descent on the output error, e.g. through the Backpropagation algorithm, or Restricted Boltzmann Machine Learning, the specifics of which are well known in the art. Variations to the training algorithm can be used, all relying on the core principle of using a database of images which are presented to the CNN during training. During training the CNN is provided with labels of categories for the presented images, though not necessarily for all of them. Relevant labels for an image are "HP bacteria present" and "HP bacteria absent"; other labels are possible according to the same principle.

Figure 5:
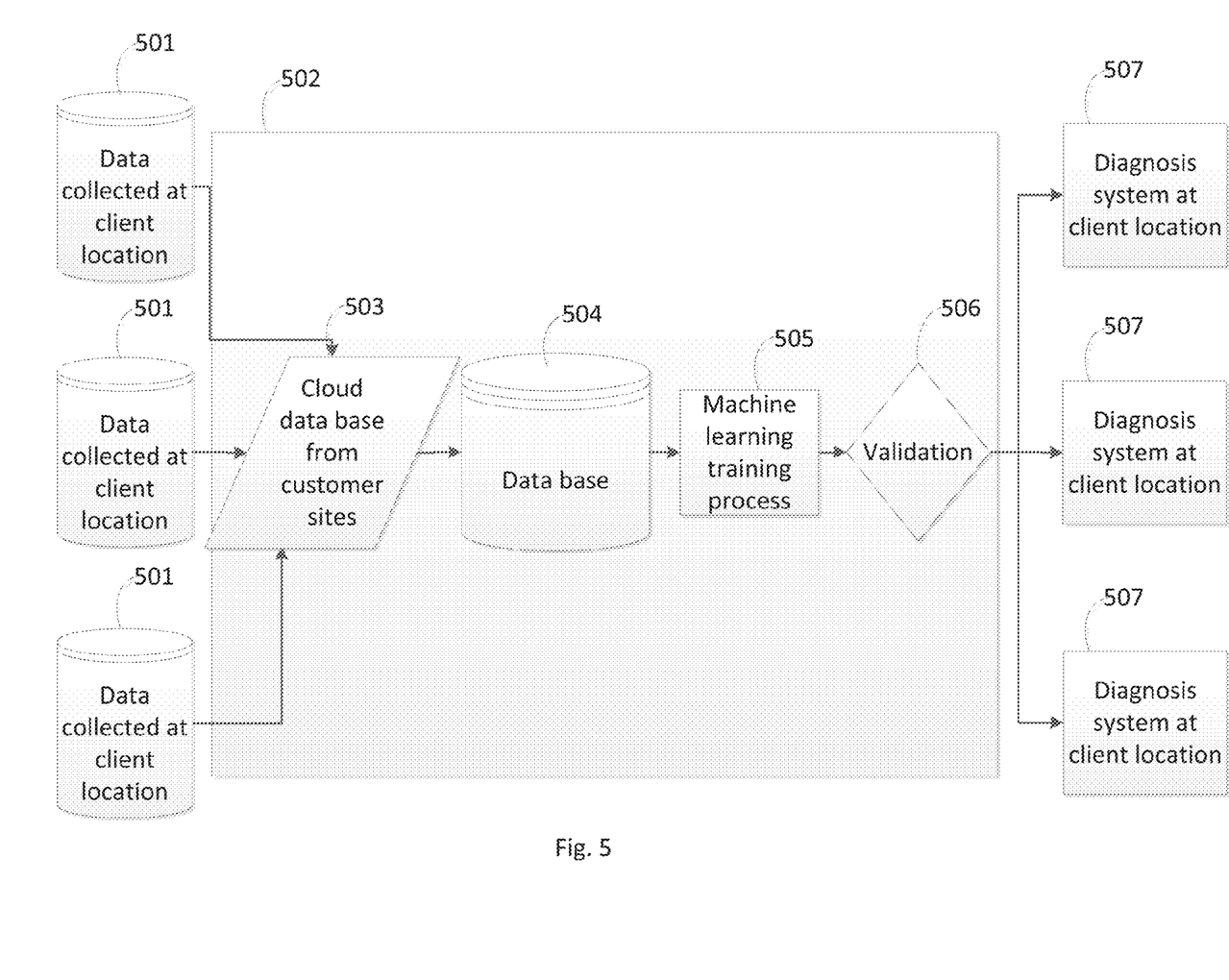
FIG. 5 shows a schematic representation of the Continuous calibration system. This is a feedback cycle created for the improvement of the diagnosis system engine situated at the client location.

As an example of the realization of the above algorithm and system, the template matching can be implemented in Matlab software package R2012b version 8.2.0.701, Gabor filters can be implemented using the Signal Processing and Image Processing toolboxes in Matlab, and the CNN can be implemented using the CNN function class available on Mathworks File Exchange (http://www.mathworks.com/matlabcentralifileexchange/24291-cnn-convolutional-neural-network-class). In the case of a 3D image composed of a sequence of multiple 2D images, the analysis may be performed by individually analyzing each of the 2D images extracted from the slide. The results of the analysis of all the layers are then combined such that all identified bacteria in all the layers are identified and reported FIG. 5 illustrates the basic information feedback cycle for the improvement of the automated diagnosis engine.

The information about confirmation or rejection of the automated diagnosis by a pathologist 501 is then communicated back to a central processor or computer server 503 that is managed as part of the proprietary system 502. This feedback information is accumulated from multiple, possibly independent users of the system who are located in diverse and distant locations. The accumulated data is examined for quality control (QC) and the high quality data are added to the existing curated database 504. The added data is used to further calibrate and fine-tune the CNN for improved performance and generalization 505.

In this way the training process of the CNN model is based on increasing amounts of data with growing accuracy and performance parameters, improving the CNN system. The resulting CNN model is then tested 506 and released back to the client sites 507.

Figure 6:
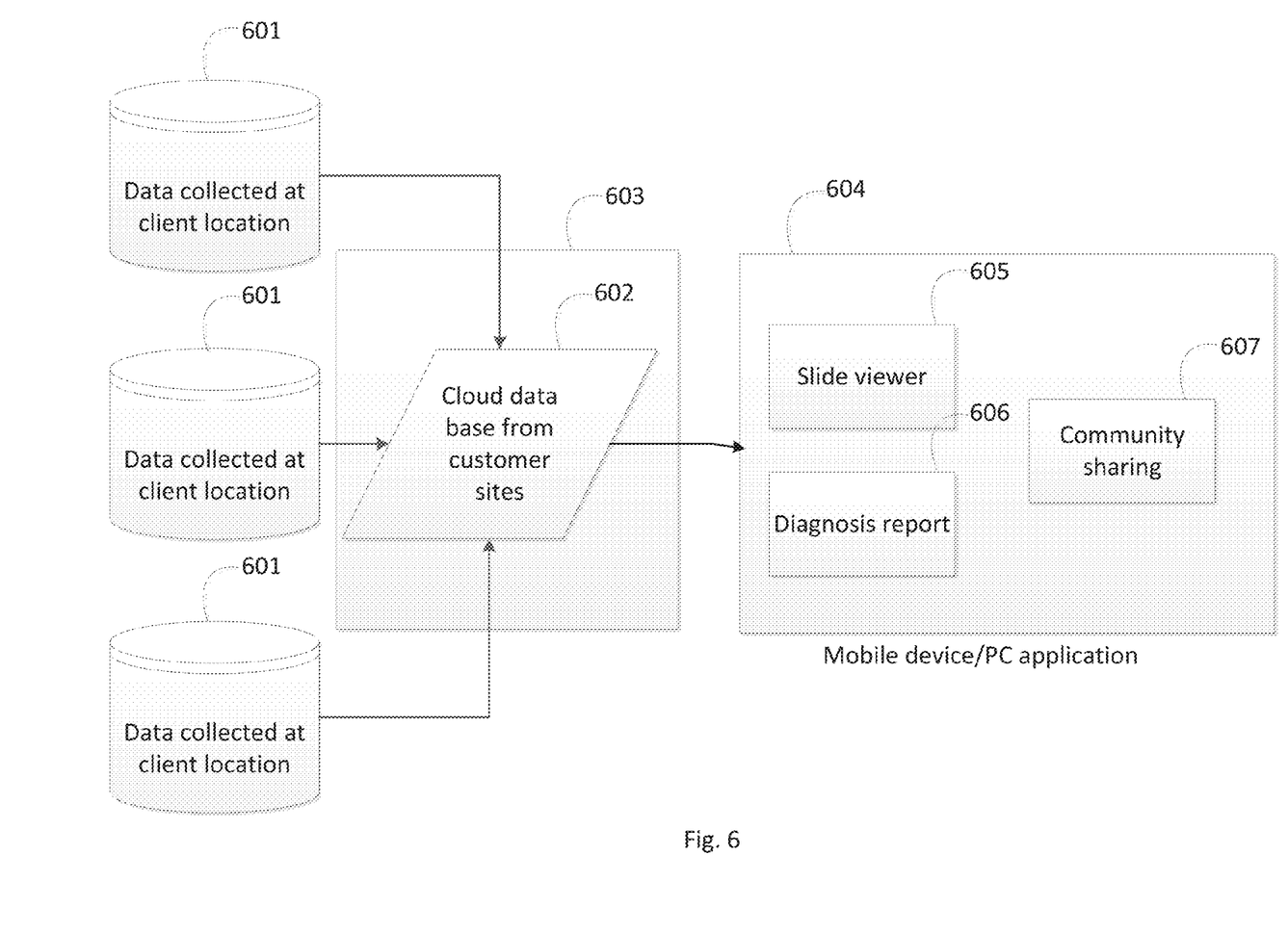
FIG. 6 shows a schematic representation of data visualization flow chart performed by the examined person with a mobile device or a computer.

FIG. 6 illustrates an additional embodiment of the invention based on the data accumulated from remote locations 601 and stored on a computer server 602 as part of system 603. The patient data is uploaded to a mobile device or PC, through the company application form 604, and contains a slide viewer 605 and a diagnosis report viewer 606. The application enables data sharing of the pathologist report and the slides for a second opinion diagnosis 607.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention. Features or dependent claims described in connection with one embodiment or independent claim may be combined with another embodiment or independent claim without departing from the scope of the invention. A method described herein may also be characterized as a system with parts adapted to carry out steps of the method.

What is claimed is:

1. A method for automated analysis and diagnosis of the presence of a bacterium in a histological specimen, comprising:

providing a histological specimen-stained slide;

obtaining a color scanned image of the slide with a digital camera using visible light illumination;

associating identification data with the slide;

transforming the color scanned image into a single band image;

searching parts of the single band image that match a template pattern identified by gray level values, wherein parts matching the pattern are candidate object components, said searching including     segmenting the image and identifying closed object areas in the image using edge detection and completion;

for each closed object, calculating spatial two dimensional second moments;

obtaining an image covariance matrix;

calculating eigenvectors and eigenvalues of the image covariance matrix; and     for each closed object, testing if a total area and the covariance eigenvalues, correspond to those of images of *Helicobacter pylori*; and     declaring the closed image a candidate object component or not a candidate object component based on the results of said testing;

classifying the candidate object components with a subsequent additional machine learning classifier;

creating from said machine learning classifier an automatic decision support diagnosis report of the presence or absence of the bacterium in the specimen; and storing images with associated metadata and the decision support diagnosis report in a computer readable medium.

2. The method according to claim 1, wherein the decision support diagnosis report provides a measure of the presence or absence of *Helicobacter pylori* in a histological sample on the specimen slide.

3. The method of claim 1, further comprising looking up a slide by specifying unique slide identification metadata.

4. The method according to claim 1, wherein searching parts of the single band image that match a template pattern comprises testing each pixel for being in the interior and near the central area of a bacterium in the image.

5. The method of claim 1, wherein classifying the candidate object components is performed with a convolutional neural network classifier comprising at least seven layers in total, including at least one convolutional layer, at least one pooling layer and at least one fully connected layer.

6. The method of claim 5, wherein classifying the candidate object components with a convolutional network classifier comprises providing an input layer having a single band sub-image of the candidate object component; a second layer performing pooling of data in the first layer resulting in sub images; and a third layer convolving with the second layer resulting in additional sub images.

7. The method of claim 1, comprising searching parts of the single band image to identify coordinates of candidate object components, and performing said classifying of said candidate object components on the color scanned image.

8. The method of claim 1, further comprising displaying at least one region of the single band image of the specimen, smaller than the image of the specimen, suspected of containing *Helicobacter pylori*.

9. The method of claim 1, wherein the image comprises at least one 3D image.

10. The method of claim 1, comprising receiving information relating to a pathology decision and storing said information associated with said automatic decision support diagnosis report.

11. The method of claim 1, wherein the digital camera comprises a color charge-coupled device (CCD) or complementary metal-oxide semiconductor (CMOS).

12. The method according to claim 1, wherein the specimen is prepared with a single staining agent without the use of a dye to create a signal.

13. A system for automated analysis and diagnosis of the presence of a *Helicobacter pylori* bacterium in a histological specimen, comprising a histological specimen-stained slide;

an automated microscope for enlarging images of the slide;

a digital camera for creating a digital image from the slide;

a mechanical stage control for automatically scanning the specimen;

a slide feeder;

a computer running an image processing classifier for analyzing the digital image and providing decision support diagnosis of the presence or absence of the *Helicobacter pylori* bacterium in the specimen;

an external database for images and report storage; wherein the computer running an image processing classifier is adapted to search parts of a single band image obtained from the digital image that match a template pattern of *Helicobacter pylori* bacterium identified by gray level values, wherein parts matching the pattern are identified as candidate object components; and classify the candidate object components with a subsequent machine learning classifier to obtain an automatic decision support diagnosis report of the presence or absence of the bacterium in the specimen, which is then stored in an external database, wherein the subsequent machine language classifier is a convolutional neural network classifier comprising at least seven layers in total, including at least one convolutional layer, at least one pooling layer and at least one fully connected layer.

14. The system of claim 13, wherein the pattern is a template mask of *Helicobacter pylori*.

15. The system of claim 13, wherein the system is adapted to transfer, store and retrieve associated images, metadata and diagnosis reports in local storage or network storage.

16. The system of claim 13, further comprising a display module adapted to display regions of the image, smaller than the image, identified by the automatic decision support diagnosis report.

17. The system of claim 13, wherein the system is adapted to receive information relating to a pathology decision and store said information associated with said automatic decision support diagnosis report.

18. The system of claim 13, adapted to obtain and classify 3D images.

19. The system of claim 13, wherein the specimen-stained slide is a histological biopsy and said automatic decision support diagnosis report includes information about the presence or absence of *Helicobacter pylori* in the biopsy.

20. The system according to claim 13, wherein the specimen comprises a single staining agent without the use of dye to create a signal.

* * * * *